(12) United States Patent
Backmann et al.

(10) Patent No.: US 10,576,660 B2
(45) Date of Patent: Mar. 3, 2020

(54) OVERTURNING DEVICE FOR OVERTURNING MOLTEN MATERIAL AND PURGING METHOD

(71) Applicant: Windmöller & Hölscher KG, Lengerich (DE)

(72) Inventors: Martin Backmann, Lengerich (DE); Hermann-Josef Jäckering, Emsbüren (DE); Markus Bussmann, Essen (DE); Bernd Liesbrock, Lengerich (DE); Karsten Golubski, Haltern am See (DE)

(73) Assignee: WINDMÖLLER & HÖLSCHER KG (DE)

( * ) Notice: Subject to any disclaimer, the term of this patent is extended or adjusted under 35 U.S.C. 154(b) by 222 days.

(21) Appl. No.: 15/508,423

(22) PCT Filed: Sep. 2, 2015

(86) PCT No.: PCT/EP2015/069997
§ 371 (c)(1),
(2) Date: Mar. 2, 2017

(87) PCT Pub. No.: WO2016/034605
PCT Pub. Date: Mar. 10, 2016

(65) Prior Publication Data
US 2017/0282409 A1 Oct. 5, 2017

(30) Foreign Application Priority Data
Sep. 3, 2014 (DE) .......... 10 2014 112 712

(51) Int. Cl.
*B29C 48/36* (2019.01)
*B29B 7/32* (2006.01)
(Continued)

(52) U.S. Cl.
CPC .............. *B29B 7/325* (2013.01); *B01F 5/064* (2013.01); *B01F 5/0641* (2013.01);
(Continued)

(58) Field of Classification Search
CPC ..... B29C 48/326; B29C 48/362; B01F 5/064; B01F 5/0641; B01F 5/0642; B01F 5/0643; B01F 5/0644; B01F 5/0645; F15D 1/02
See application file for complete search history.

(56) References Cited

U.S. PATENT DOCUMENTS 1,637,697 A * 8/1927 Jacobsen ............... B01F 5/0644
366/336
3,470,914 A * 10/1969 Smith ....................... F15D 1/02
138/39
(Continued)

FOREIGN PATENT DOCUMENTS

CN 102672954 A 9/2012
CN 102672954 B * 8/2014 ............. B29C 55/28
(Continued)

OTHER PUBLICATIONS

Machine translation of JP 2011-235546, retrieved from Google Patents Aug. 8, 2019 (Year: 2011).*
(Continued)

*Primary Examiner* — Timothy Kennedy
(74) *Attorney, Agent, or Firm* — Rutan & Tucker, LLP

(57) ABSTRACT

The present invention relates to an overturning device (10) for overturning a molten material (200) in a melt channel (110) comprising a melt inlet (20) and a melt outlet (30), wherein between the melt inlet (20) and the melt outlet (30) at least one melt guiding means (40) is assembled for a rearrangement of molten material (200) from the centre (22) of the melt inlet (20) to the edge (34) of the melt outlet (30)
(Continued)

and for a rearrangement of molten material (200) from the edge (24) of the melt inlet (20) into the centre (32) of the melt outlet (30).

15 Claims, 9 Drawing Sheets

(51) Int. Cl.
| | | |
|---|---|---|
| *B29C 48/10* | (2019.01) | |
| *B29C 48/00* | (2019.01) | |
| *B29C 48/27* | (2019.01) | |
| *B29C 48/70* | (2019.01) | |
| *B29C 48/25* | (2019.01) | |
| *B29B 7/80* | (2006.01) | |
| *B29C 48/275* | (2019.01) | |
| *B01F 5/06* | (2006.01) | |
| *F15D 1/02* | (2006.01) | |
| *B29C 45/17* | (2006.01) | |
| *B29C 48/32* | (2019.01) | |
| *B29C 48/30* | (2019.01) | |

(52) U.S. Cl.
CPC .......... *B01F 5/0642* (2013.01); *B01F 5/0643* (2013.01); *B01F 5/0644* (2013.01); *B01F 5/0645* (2013.01); *B29B 7/802* (2013.01); *B29C 48/0018* (2019.02); *B29C 48/10* (2019.02); *B29C 48/256* (2019.02); *B29C 48/2692* (2019.02); *B29C 48/27* (2019.02); *B29C 48/277* (2019.02); *B29C 48/362* (2019.02); *B29C 48/70* (2019.02); *B29C 48/705* (2019.02); *F15D 1/02* (2013.01); *B29C 45/1753* (2013.01); *B29C 48/30* (2019.02); *B29C 48/32* (2019.02)

(56) References Cited

U.S. PATENT DOCUMENTS

| | | |
|---|---|---|
| 3,811,073 A | 5/1974 | Shuey et al. |
| 4,541,982 A | 9/1985 | Upmeier |
| 2005/0037220 A1* | 2/2005 | Smith .................... B29C 48/76 |
| | | 428/523 |
| 2011/0001267 A1 | 1/2011 | Demin |

FOREIGN PATENT DOCUMENTS

| | | |
|---|---|---|
| DE | 6752197 U | 2/1969 |
| DE | 1956459 A1 | 5/1971 |
| DE | 2006941 A1 | 8/1971 |
| DE | 2129971 B | 5/1972 |
| DE | 2428321 A1 | 1/1976 |
| DE | 3245084 A1 | 6/1984 |
| EP | 0113041 A1 | 11/1983 |
| EP | 0887172 A1 | 12/1996 |
| GB | 900656 A | 7/1962 |
| JP | 2011235546 A | 11/2011 |

OTHER PUBLICATIONS

Germany Patent & Trademark Office—Examination Report dated Mar. 27, 2015, for corresponding German Application No. 102014112712.9, 10 pages, Munich, DE.
European Patent Office—International Search Report and Written Opinion (including English translation) dated Nov. 20, 2015, for corresponding International Application No. PCT/EP2015/069997, 15 pages, Rijswijk, NL.
European Patent Office—International Preliminary Report on Patentability (including English translation) dated Mar. 9, 2017, for corresponding International Application No. PCT/EP2015/069997, 28 pages, Munchen, DE (translation by IB, Geneva, CH).
EP 15757488.0 filed Feb. 28, 2017 Office Action dated May 10, 2019.

\* cited by examiner

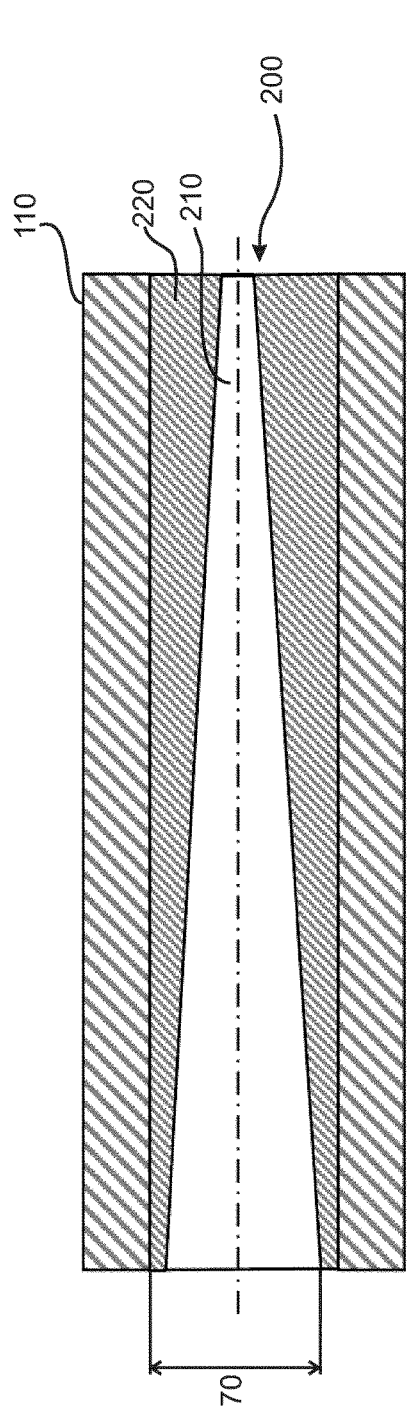
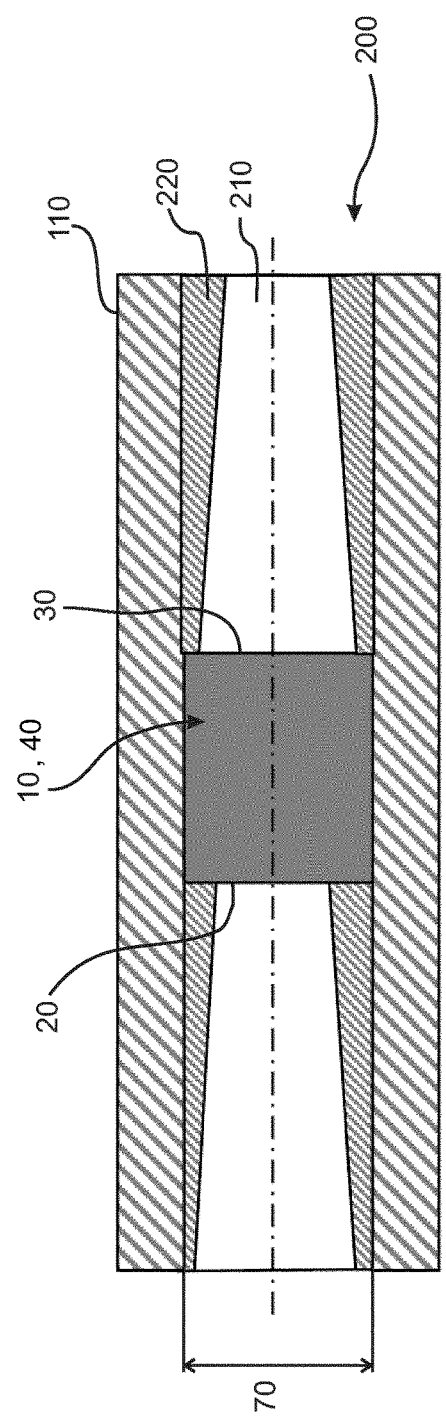

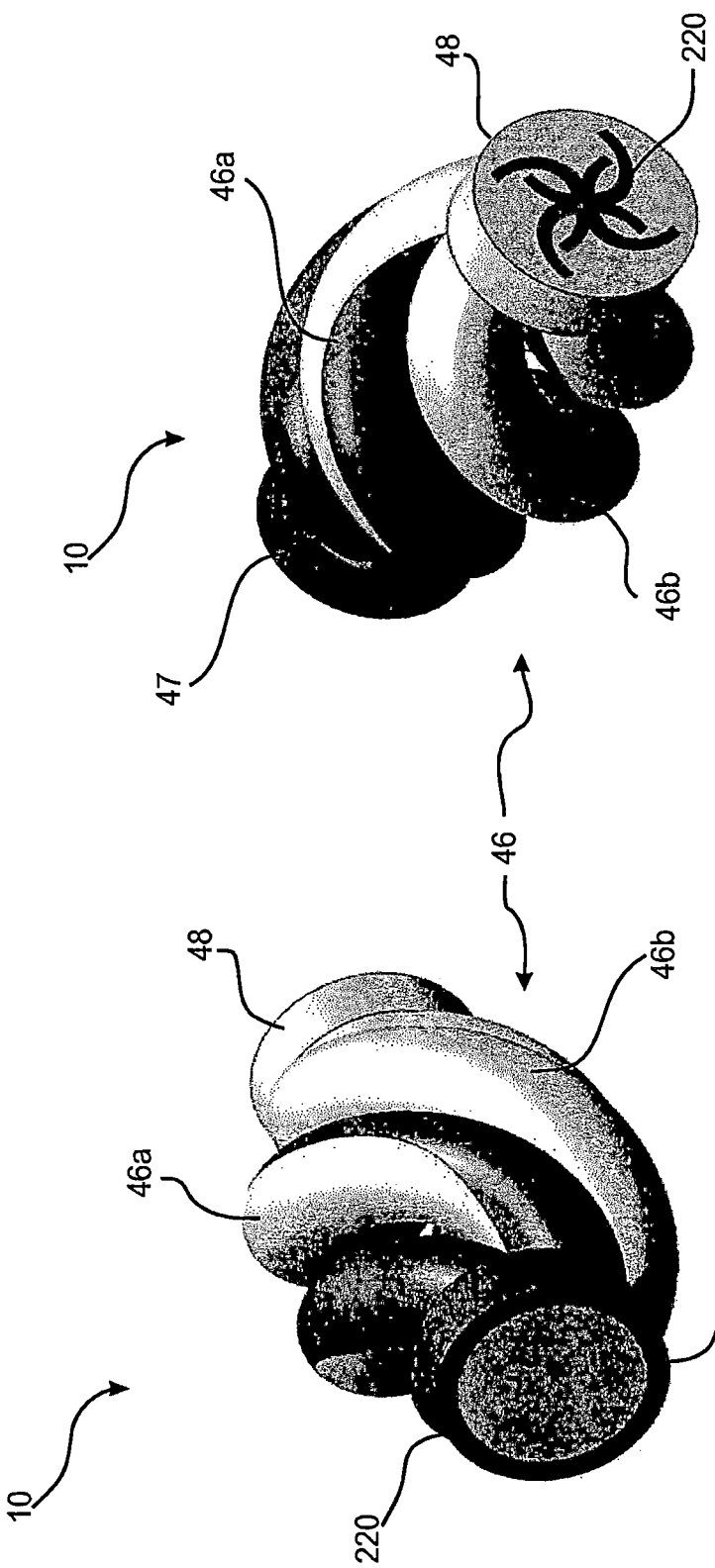

OVERTURNING DEVICE FOR OVERTURNING MOLTEN MATERIAL AND PURGING METHOD

CROSS-REFERENCE TO RELATED APPLICATIONS

This patent application is a U.S. National Phase Application under 35 U.S.C. § 371 of International Application No. PCT/EP2015/069997, filed Sep. 2, 2015, entitled OVERTURNING DEVICE FOR OVERTURNING MOLTEN MATERIAL AND PURGING METHOD, which claims the benefit of priority of German Patent Application No. 10 2014 112 712.9, filed Sep. 3, 2014.

BACKGROUND

Field

The present invention relates to an overturning device for overturning of a molten material in a melt channel, a blow head for performing a blow head extrusion method and a method for performing a purge process in an extrusion device.

Background Information

It is known that extrusion devices are used in order to produce plastic melt. This plastic melt can be continued to use in different manners. Thus, it is for example possible to introduce the molten material into a cavity of an injection moulding device in order to produce corresponding components by injection moulding. Further, it is known that the molten material is provided for a so called blow extrusion method with which a blow film is extruded. In all cases it is necessary that at the edge of the extruder the liquefied molten material is transported to the respective place of use via corresponding melt channels. These channels can be arbitrary complex and particularly distribute to simple channels.

It is a disadvantage with the known solutions of extrusion devices that those involve a high effort for the change of material. Thus, a so called purging method has to be performed in case a change of material from a first molten material to a second molten material should occur. If, for example, with a blown extrusion device for a certain time a product with a blue foil colour is produced and subsequently a change to a transparent foil colour is desired, initially the blue foil colour and the corresponding molten material has to be purged from the single melt channels. Herefore, the extrusion device is already operated with the secondary material until most of the old material of the molten material is purged out.

Since with melt channels in the edge region of these melt channels the transport speed is mainly zero, the old material so to say sticks, the purge method is very time consuming. With blow extrusion devices with a throughput of up to approximately 120 kg molten material per hour thereby a purge method normally can take 20 minutes up to 1.5 hours. For each film layer for which a change of material should occur this leads to 120 kg or more waste material of the molten material. With multiple film layers this amount is multiplied with the amount of film layers, even if only one single film layer is purged. Therewith, waste rates of up to 1000 kg can be reached. Simultaneously, the purging time represents a downtime for the machine in which no useable production can occur. Accordingly, the known extrusion devices with the corresponding purge method comprise significant disadvantages concerning the time effort and concerning the corresponding costs and the material waste.

SUMMARY

It is object of the present invention to at least partially avoid the previously described disadvantages. Particularly it is object of the present invention to reduce the time for the purge process in a cost efficient and simple manner.

Previous object is solved by an overturning device with the features of claim 1, a blow head with the features of claim 12 and a method with the features of claim 14. Further features and details of the invention result from the dependent claims, the description and the drawings. Thereby, features and details which are described in connection with the overturning device according to the invention naturally also apply with the blow head according to the invention and the method according to the invention and vice versa, such that according to the disclosure of the single aspects of the invention it can always be reciprocally related to.

An overturning device according to the invention serves for overturning a molten material in a melt channel. Herefore, the overturning device comprises a melt inlet and a melt outlet, wherein between the melt inlet and the melt outlet at least a melt guiding means is assembled. The melt guiding means serves for a rearrangement of molten material from the centre of the melt inlet to the edge of the melt outlet. Further, the melt guiding means is configured for a rearrangement of the molten material from the edge of the melt inlet into the centre of the melt outlet.

By the centre of the melt channel thereby basically the area has to be understood that is spaced apart from the edge. Particularly, a rearranging occurs away from the edge. For example the centre of the melt outlet of the whole melt outlet area can comprise a distance of approximately 5 mm towards the edge.

By an overturning device according to the invention a rearranging of the molten material in the melt channel occurs automatically without moveable parts by an active guidance with the help of the melt guiding means. The overturning device can be introduced into the melt channel or can configure a part of the melt channel. Via the melt inlet a fluid communication connection to the melt channel is established such that the molten material can flow into the overturning device via the melt inlet. Subsequent to a passing of the melt inlet the molten material is rearranged via the melt guiding means in a manner according to the invention. At the melt outlet the rearranged molten material can exit the overturning device and can flow further via the fluid communicating connection within the melt channel.

According to the invention the melt guiding means are configured for the rearrangement of the molten material. Thereby, two basic rearrangement functionalities are provided. At the melt inlet the molten material from the centre is used and is guided towards the edge of the melt outlet. Simultaneously, and via the same length a rearrangement of the molten material from the edge of the melt inlet into the centre of the melt outlet occurs. Therewith, the material from the centre at the melt inlet is exchanged with the material at the edge of the melt outlet such that at the melt outlet a complete rearranged melt layer situation exists.

An overturning device according to the invention now significantly reduces the purge time with the use in an extrusion device. Thus, in a purge situation it can be assumed that old molten material in the area of the edge of the melt channel remains in the centre for a longer time.

Thus, during the purge process relatively fast the centre of the melt channel is completely filled with new but fresh and therewith new molten material, wherein at the edge a high proportion of the old material remains. By the use of an overturning device according to the invention a rearrangement of this old material from the edge of the melt channel into the centre of the melt channel occurs and therewith in the area of the faster or higher flow-through guide. This leads to the fact that so to say old molten material is rearranged from before the overturning device into the centre of the melt channel after the overturning device such that it can be transported even faster in the centre. Therewith, that the rearrangement occurs in a manner according to the invention a significant reduction of the purge time and therewith a faster output of the old material from the melt channel can be achieved.

Particularly, by an overturning device according to the invention a reduction of up to 50% of the whole purge time can be achieved. A further advantage is the reduction of the residence time of the molten material at the edge in the normal operation. In this manner the thermal influence to the material can be reduced, wherein material impairments can be reduced or even avoided.

The overturning device can thereby be used in the melt channel or can configure the melt channel. Naturally, two or more overturning devices can be intended in the melt channel with a defined distance. It is preferred like subsequently described when the overturning device is assembled mainly in the centre in relation to the length of the melt channel.

The melt guidance with the use of the melt guiding means can thereby be configured in different manners. Thus, the subsequently described functions in a division can be provided by a melt guiding means like this is possible by active guidance channels within the melt channel. These two different overturning functionalities are subsequently described.

It is an advantage when with the overturning device according to the invention the at least one melt guiding means comprises a separation section with a first separation channel and a second separation channel. Thereby, previous to the separation section a division section for dividing the molten material to separation channels and after the separation section a combination section for merging the molten material from separation channels is assembled. This configuration of a melt guiding means can naturally be basically combined with melt guiding means of both previous paragraphs. By this separation function likewise a rearrangement can occur. Thus, the amount of the molten material in the two separation channels is separated by the separation section. This naturally also applies for the edge layer of the molten material such that in both separation channels only a part of the edge, mainly particularly half of the edge, is equipped with old material, while in the area of the division section the other half of the edge is already equipped with fresh material. In case the combination section for merging the molten material from the separation channels is aligned geometrically in a corresponding manner, this leads to the fact that at least a part of the edge layer remains with the new material also with combination of the sectional flows of the molten material. Therewith, by the functionality of the division and the combination likewise a possibility of a rearrangement according to the invention can be ensured. Particularly, such a partial rearrangement is combined with a corresponding separation section with guidance channels like described in the previous paraphraphs.

An overturning device according to the previous paragraph can be further improved in that the combination section is configured for a central merging of the edge sections of the molten material. Thereby, it is to be understood that an explicit geometric adjustment of the single separation channels exists in the combination section. In case, for example, in the division section the edge sections with old material of the molten material exist at the outer side of the respective separation channel, thus the both separation channels can be merged in the combination section such that both edge sections of the molten material are centrally merged in the separation channels with old material. Therewith, a recombination of the section flows of the molten material occurs by a complete or mainly complete rearrangement such that by a skillful recombination of the separation flows the edge layer in front of the melt inlet is relocated into the centre of the melt outlet. Simultaneously, new material from the centre of the melt outlet is relocated to the edge layers and therewith to the edge of the melt outlet. Thereby, preferably the respective diameter of the section channels is adapted to the diameter in front of the division section and after the combination section. In case, for example, a division to two separation channels occurs, thus the separation channels preferably comprise in total the half diameter respectively in comparison to the diameter of the melt inlet.

It can be likewise an advantage when with the overturning device according to the invention the section channels are curved, particularly by configuration of a torus shape. The section channels can in this manner ensure a particularly compact structure shape of the overturning device. Thus, by the curved configuration of the section channels a sufficient length of the whole separation section can be provided and at the same time the geometric dimensions of the overturning device can be minimized. Further, the separation channels are reduced concerning their maximum length such that an unnecessary space requirement can be avoided. The curving of the single separation channels can differ from one another. However, it is preferred when the single separation channels comprise the same or mainly the same separation channels or the same curving. Preferably, the length and the curving between the existent separation channels is identical so that the separation channels are configured at least partially, preferably completely, symmetrically to one another. This leads to the fact that particularly with mainly circular or semicircular curves a torus shape can be established with the separation channels. This leads besides the particularly compact structure shape to fluidic advantages such that between the influx in the division section and outflux in the combination section only little or no differences in flow velocity exist. This leads to an improved product quality with the use of the overturning device since film ruptures are effectively prevented.

It can be a further advantage when with the overturning device according to the invention the separation channels comprise an equal or mainly equal length. Therewith, a delay for the combining in the combination section is particularly effectively and efficiently prevented. Further, by a delay reduction an undesired film rupture can be avoided or at least reduced. Finally, by an adaptation of the length of both section channels likewise a positive influence to the compactness of the construction shape of the whole overturning device can be made.

Likewise it can be an advantage when with the overturning device according to the invention the flow direction of the molten material in the combination section comprises a sharp angle with the flow direction of the molten material in the division section. Thereby, it has to be understood that at least a partially existing deflection of the flow direction of the molten material occurs. It is preferred when this deflection occurs in a sharp angle such that particularly a reversal or a partly leading back of the molten material is performed. This leads so to say to a nesting or an intertwining of the section channels in the combination section such that the rearrangement according to the invention can be performed even more complex concerning the construction of the overturning device. For example, in the topview circular forms or forms of hearts can be configured. The leading back so to say automatically leads to a combination possibility like it was previously described. Thus, by a simple reversal of the flow direction automatically the molten material at the edge is recombined in the centre such that the rearrangement functionality according to the invention can be achieved so to say automatically by an adjustment of the flow direction in a sharp angle.

It is further an advantage when with the overturning device according to the invention the section channels comprise a curvature which alters the flow direction of the molten material at least sectionally in comparison to the flow direction of the molten material in the division section about more than approximately 90°. Thereby it is to be understood that a sufficient deflection occurs. Particularly, this deflection with relation to the melt channel can be performed upwards or downwards. Therewith, it is possible that the rearrangement functionality is performed even more compact. Particularly, three dimensional constructs of an intertwined section channel geometry can be used in order to make the rearrangement functionality according to the invention possible. Thus, for example the combination section can be assembled enclosed between the single separation channels. Thus, in this manner the combination section enables the rearrangement according to the invention in cost efficient, simple and in particular compact construction dimensions. Accordingly, in this manner even more compact construction dimensions can be achieved for the overturning device according to the invention.

It can be a further advantage when with the overturning device according to the invention the separation channels comprise a separation wall which newly emerges by the distribution and an outer wall which is taken over from the division section. Therewith, the outer walls of the separation channel are merged in the combination section and the separation walls pass over into the outer walls of the combination section. Hereby, it is about an explicit geometric correlation how the single walls correlate with one another via the flow pattern of the molten material. With the separation in the division section the wall area is enlarged accordingly. This means that parts of the wall area, namely the separation walls, correlate accordingly also with newly established edge sections of the molten material at the edge of the separation walls. This is accordingly intended from the centre of the flowing molten material such that the separation walls comprise new molten material at the edge. The outer walls which are taken over from the melt channel or the melt inlet via the division section now are further equipped with the old molten material. By the recombination in the combination section with which the separation walls merge into the outer walls of the combination section, so to say the melt outlet is equipped with outer walls which are now equipped with new molten material by the correlation with the separation walls. In the same manner the outer walls of the single separation channels which correlate with the old molten material are merged centrally and so to say dissolve. Therewith, the corresponding old molten material is merged from the dissolving outer walls of the separation channels in the centre of the combination section and the rearrangement process according to the invention is terminated. In other words, the single separation channels can comprise any change of direction or curving without having an influence on the corresponding adjustment of the separation walls and outer walls and therewith accompanying the adjustment of the old molten material and the new molten material. Rather, the adjustment of the outer walls and the separation walls and therewith the adjustment of the new molten material and the old molten material follows each curving and therewith the course of the single separation channels.

It can be a further advantage when with the overturning device according to the invention the separation channels at least partially comprise a spiral form with one another. The spiral form is particularly configurable with two or more separation channels. Thereby, preferably the spiral rotation occurs about angle degrees which correlate with the amount of separation channels. If, for example, two separation channels are existent, the spiral is preferably equipped with the spiral rotation angle of 180°. In case four separation channels are provided, preferably a rotation angle for the spiral of 90° is intended. Accordingly, a preferred rotation angle for this spiral results from a calculation in which 360° is divided by the amount of the present separation channels.

A further advantage is achievable when with the overturning device according to the invention a shifting device is provided for a shifting of the overturning device between a first position and a second position. In the first position the melt inlet and the melt outlet are in a fluid communicating connection with the melt channel. In the second position the melt inlet and the melt outlet are separated from the melt channel. Therewith, the shifting device can, for example, perform a translational, rotary or a movement in a combined manner of the overturning device. Particularly, a pipe section or a channel section is provided for the overturning device in the second position which connects both remaining edge sections of the melt channel in a fluid communicating manner. The shifting device allows switching on the rearrangement function so to say by an insertion of the overturning device and switching it off by the pushing outwards of the overturning device. Since the overturning device produces a corresponding pressure loss situation by its overturning functionality, it is an advantage to switch off the overturning function in the normal operation. Therewith, the increased pressure loss is only used during the purge process in order to ensure the corresponding rearrangement function. Since the increased pressure loss of the overturning device is switched off by a pushing out of the overturning device in the second position in the normal operation this can accordingly not disturb.

It is further an advantage when with the overturning device according to the invention the melt inlet and the melt outlet comprise a free flow area which corresponds or mainly corresponds to the free flow area of the melt channel. With other words, a fluid communication connection between the melt inlet and the melt channel or between the melt outlet and the melt channel is enabled continuously and without edges or cross section variations. Such an overturning device can be inserted completely in the melt channel or can at least partially configure the melt channel. With a free flow area thereby the cross section perpendicular to the flow at the respective position has to be understood. With other words the free flow section configures the flow section cross section via which the volume stream of the molten material can flow.

It is further an advantage when with the overturning device according to the invention the free flow area corresponds or mainly corresponds to the melt guiding means, the free flow area of the melt inlet and/or the free flow area of the melt outlet. Particularly, this embodiment is combined with the embodiment according to the previous paragraph. The flow area of the melt guiding means is thereby preferably the total of all melt guiding means. By this complying a constant free flow area is provided such that the pressure loss is prevented or mainly prevented by the cross section restriction. This significantly reduces the adapted pressure loss during flow-through of the molten material. Only or mainly only a pressure loss remains, which is produced by the corresponding influence on the flow direction and therewith accompanying by the active rearrangement of the molten material. Thus, for example an extension of the melt channel can permit such geometric correlations in the area of the overturning device. Further, it is possible that with the separation in a separation channel the corresponding adjustment of the flow area by the corresponding diameter of the separation channels can be provided.

Likewise, subject matter of the present invention is a blow head for the performance of a blow film extrusion device. Such a blow head at least comprises a melt channel for the conveyance of molten material to a blow outlet of the blow head. A blow head according to the invention is characterized in that in the at least one melt channel at least one overturning device according to the present invention is assembled. Therewith, a blow head according to the invention comprises the same advantages like they are described in detail in relation to the overturning device according to the invention. The melt channel thereby is in a fluid communication connection with the melt inlet and the melt outlet of the overturning device. Particularly, such a blow head with two or more melt channels for different layers of the blow film is intended. The overturning device is preferably assembled in the same or identical configuration in order to provide for all melt channels the same purge time reduction in a manner according to the invention.

A blow head according to the previous paragraphs can be further improved in that the overturning device related to the length of the melt channel is assembled in the centre or mainly in the centre of the melt channel. Thereby, this is about an optimized positioning of the overturning device which ensures the maximum reduction of the purge time about approximately 50%. Naturally, also two or more overturning devices are possible which are used preferably with the same identical separation in the respective melt channel.

A blow head according to the invention can be further improved in that neighbouring separation channels of neighbouring overturning devices are newly combined to melt channels. With other words the single overturning devices interact with one another or are merging with one another. Thus, starting from a single melt channel a division section can be provided which performs the corresponding division in two separation channels. Left and right respectively neighbouring melt channels can in an identical manner intend a division in two separation channels starting from the central melt channel. Starting from the central melt channel now the right separation channel can be merged with a left separation channel of the right melt channel in a combination section. In the same manner the left separation channel of the central melt channel can be merged with the right separation channel of the left melt channel in a combination section. In total a plurality of melt channels can configure a circle such that in principle a shifting in the circumferential direction provides a correlation of the single overturning devices with one another for the combination sections. Thereby, it is possible without the need of a high construction space to configure a corresponding overturning device for a plurality of melt channels. Besides the reduction of the space requirements such a star distribution can provide advantages concerning the actual flow pattern within the single melt channels and mainly in the combinations sections.

With a blow head according to the invention it is further possible that with a combination of two or multiple overturning devices in a row each turning device covers only a part of the respective edge and therewith only the molten material in the centre of this part of the edge is rearranged. Thereby, preferably each overturning device can perform a rearrangement for other rearrangement sections such that subsequent to passing all overturning devices molten material of the entire edge can be relocated in the centre. For example, four overturning devices in a row can cover 90° extent of the edge with the rearrangement function respectively such that in total the whole extent of 360° is rearranged.

A further subject matter of the present invention is the method for the performance of a purge process in an extrusion device, particularly a blow head according to the present invention comprising the following steps:

Introducing a molten material in a melt inlet of an overturning device, particularly according to the present invention, Rearranging of the molten material from the centre of the melt inlet to the edge of a melt outlet of the overturning device, and Rearranging of the molten material from the edge of the melt inlet into the centre of the melt outlet.

A method according to the invention provides the same functionality according to the invention as an overturning device according to the invention such that the same advantages can be achieved like they are described in detail in relation to the overturning device according to the invention.

Naturally, a blow head according to the invention and/or the corresponding overturning device can be used in other extrusion units, for example in a film extrusion, particularly in a flat film extrusion. Therewith, the blow head can be configured basically as an extrusion head.

BRIEF DESCRIPTION OF THE DRAWINGS

Further advantages, features and details of the invention result from the subsequent description in which in relation to the drawings embodiments of the invention are described in detail. Thereby, the features described in the claims and in the description can be essential for the invention each single by themselves or in any combination. It is shown schematically:

FIG. 1 a schematic representation during a purge process of a known extrusion device, FIG. 2 a situation according to FIG. 1 with the use of an overturning device according to the invention, FIG. 3 a schematic representation of the effect of an overturning device according to the invention, FIG. 4 a further embodiment of an overturning device according to the invention, FIG. 5 a further embodiment of an overturning device according to the invention, FIG. 6 an embodiment of an overturning device according to the invention, FIG. 7 a further embodiment of an overturning device according to the invention, FIG. 8 the embodiment of FIG. 8 in a multiple assembly, FIG. 9 a further embodiment of an overturning device according to the invention, FIG. 10 a further embodiment of an overturning device according to the invention, FIG. 11 the embodiment of FIG. 10 in a further view, FIG. 12 an embodiment of the blow head according to the invention, and FIG. 13 a further embodiment of the blow head according to the invention.

DETAILED DESCRIPTION

Figure 4:
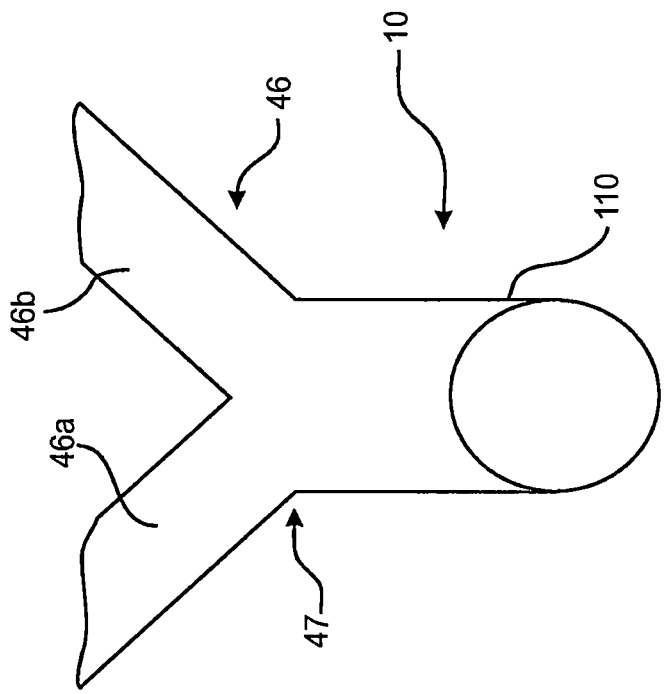

In FIG. 1 a melt channel 110 in a flow direction from left to the right is shown like it is represented during the purge process. Within the melt channel 110 a free flow area 70 is provided through which molten material 200 flows. Here, it has to be differentiated between old molten material 220 and new molten material 210. It can be recognized that over the extended course of the melt channel 110 during the purge course a ramp- or cone-like configuration between the old molten material 220 and the new molten material 210 is configured. This cone moves during the purge time in the course towards the right until finally the greatest part of the old molten material 220 is put outwards and it can be further proceeded with the active production.

In FIG. 2 the mode of action of an overturning device according to the invention is shown. Here, a rearrangement from the edge of the molten material 200 into the centre of the molten material 200 and vice versa occurs. At the melt inlet 20 of the overturning device 10 accordingly material from the edge of the molten material 200 is received and is provided in the centre at the melt outlet 30. In an inverse manner fresh or new molten material 210 is guided from the centre of the melt inlet 20 to the edge of the melt outlet 30. Like it can be recognized therewith the adjusted amount of old molten material 220 is reduced at the right edge of the melt channel 110. The representation of FIG. 2 occurs at the same time during the purge process like FIG. 1.

Figure 3:
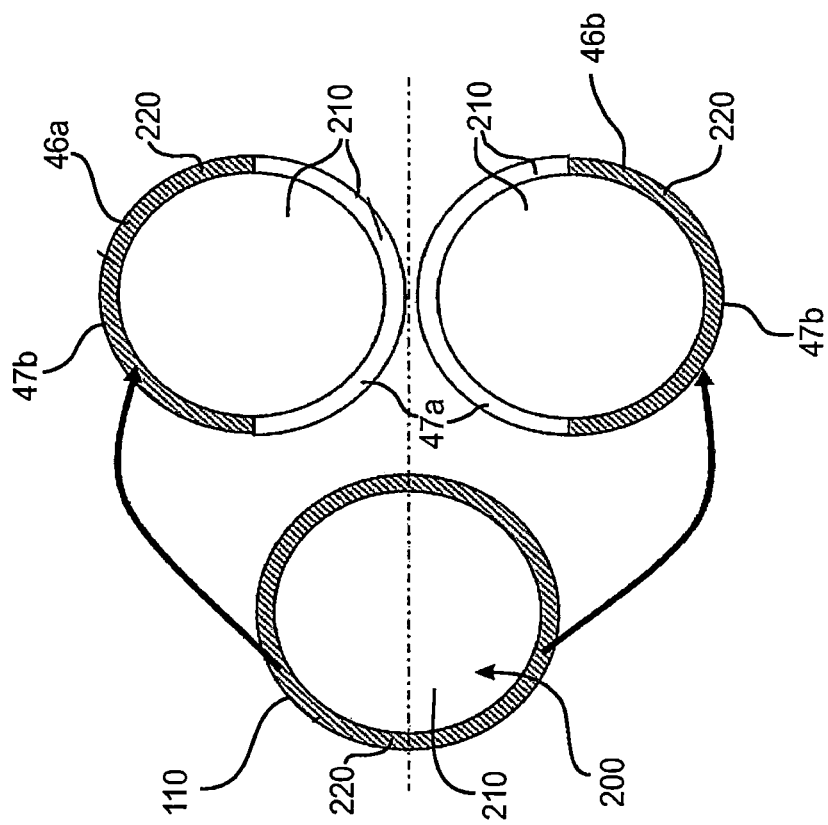

FIGS. 3 and 4 show the possibility of a rearrangement provided by a separation functionality. Starting from a melt channel 110 according to FIG. 7 by the division section 47 a division of the molten material 200 to two separation channels 46a and 46b of the separation section 46 occurs. This leads schematically to a distribution according to FIG. 6. While starting from melt channel 110 completely entirely old molten material 220 encloses the new molten material 210, by the separation in the separation channels 46a and 46b only approximately half of the extent is covered with old molten material 220. The other half is provided in the separation channels 46a and 46b at the edge with already new molten material 210. In case now by skilful combining a central merging of both separation channels 46 for the edge areas with an old molten material 220 is performed, likewise a complete or at least partial rearrangement according to the invention can occur by this separation function.

Figure 5:
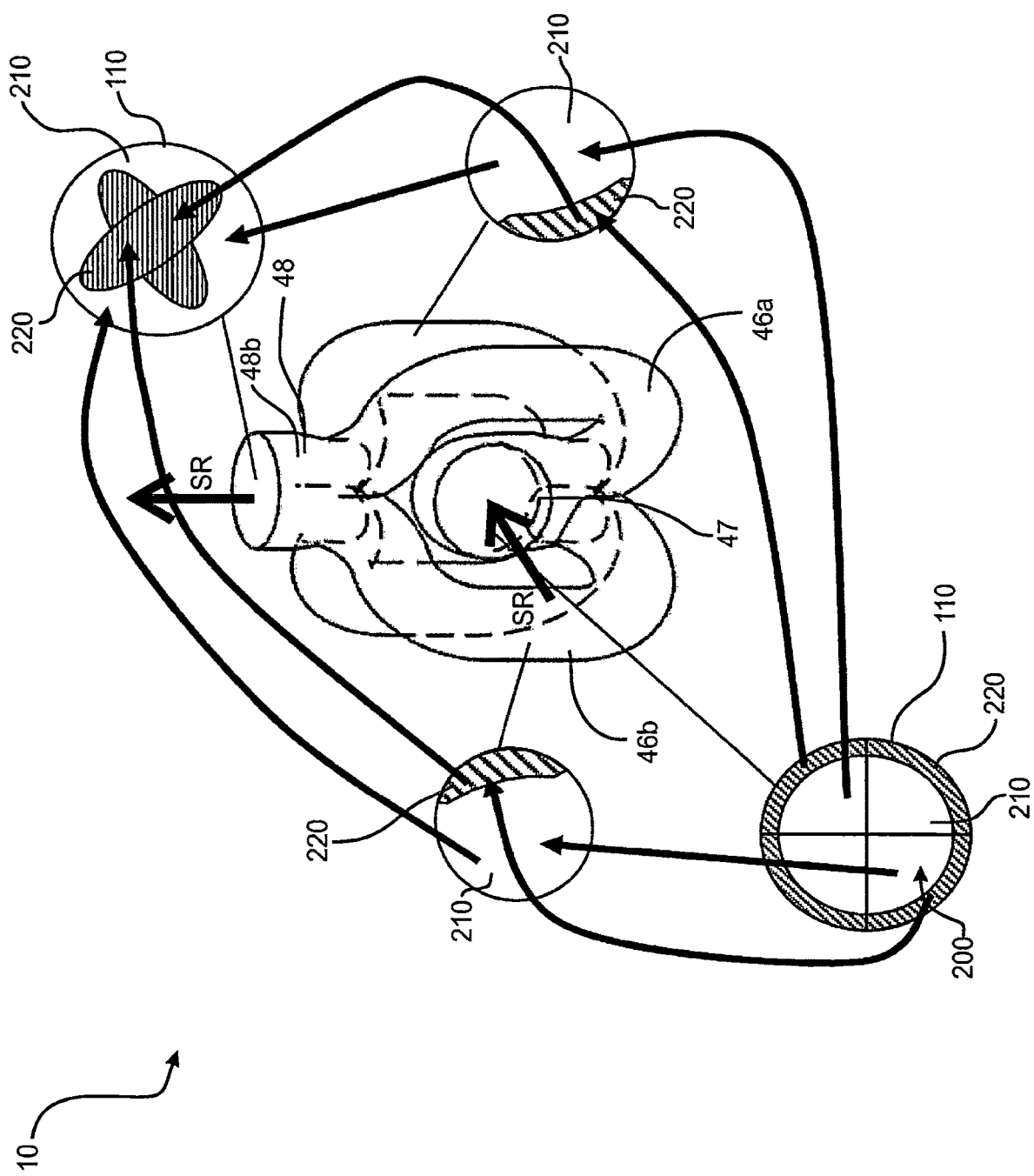

FIG. 5 shows schematically a possible further embodiment of an overturning device 10 with this separation functionality. Here, a separation to in total four separation channels 46a and 46b occurs and a recombination in a combination section 48. Schematically, further the corresponding distribution of old molten material 220 and new molten material 210 is shown in a corresponding channel. After the combination or merging at the combination section 48 the edge sections with old material 220 are completely in the centre such that the extension edge in the melt channel 110 is mainly completely configured by new molten material 210. Naturally, six or more separation channels are possible within the scope of the present invention.

Figure 6:
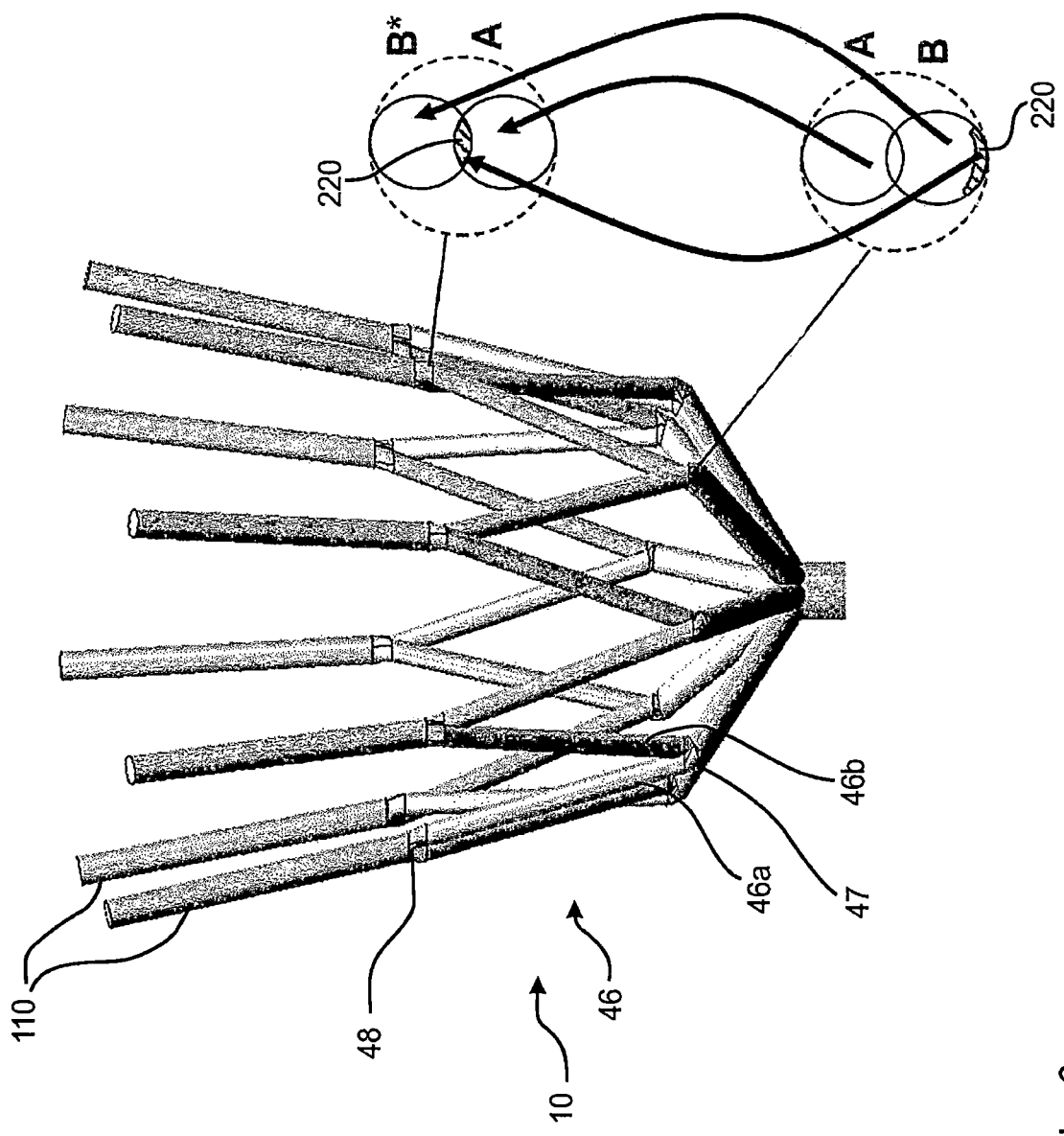

In FIG. 6 schematically the possibility is shown how the single overturning devices 10 can be in connection with one another. Thus, here a star-like representation is provided with which starting from the centre channel a plurality of star-like melt channels 110 are separated from downwards. Each melt channel 110 is configured with an overturning device 10 which comprises a separation section 46. Via corresponding division sections 47 each star-like melt channel 110 is separated in two separation channels 46a and 46b. Accordingly, subsequently in the respective combination section 48 a merging of the separation channels 46a and 46b occurs. The combination sections 48 however combine separation channels 46a and 46b which are previously separated in different melt channels 110. Therewith, a half separation offset in extent direction can be achieved according to the combination sections 48. This leads to an already repeatedly described particularly efficient combination possibility, wherein in the right part of FIG. 6 the rearrangement according to the invention of the old molten material 220 can be performed at the edge into the centre.

Figure 8:
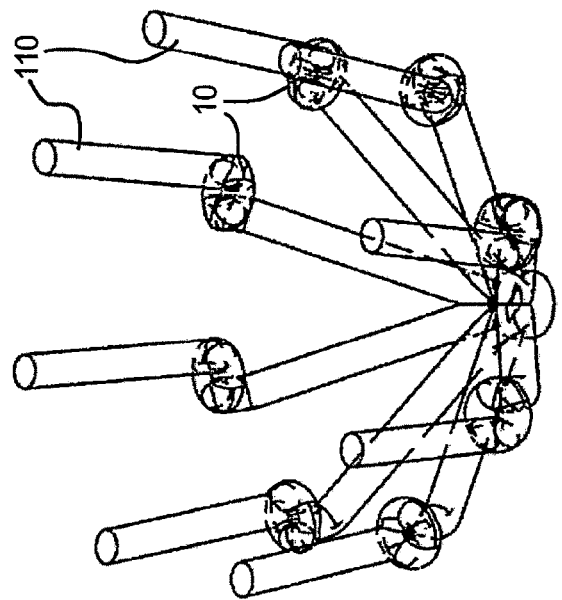
Figure 7:
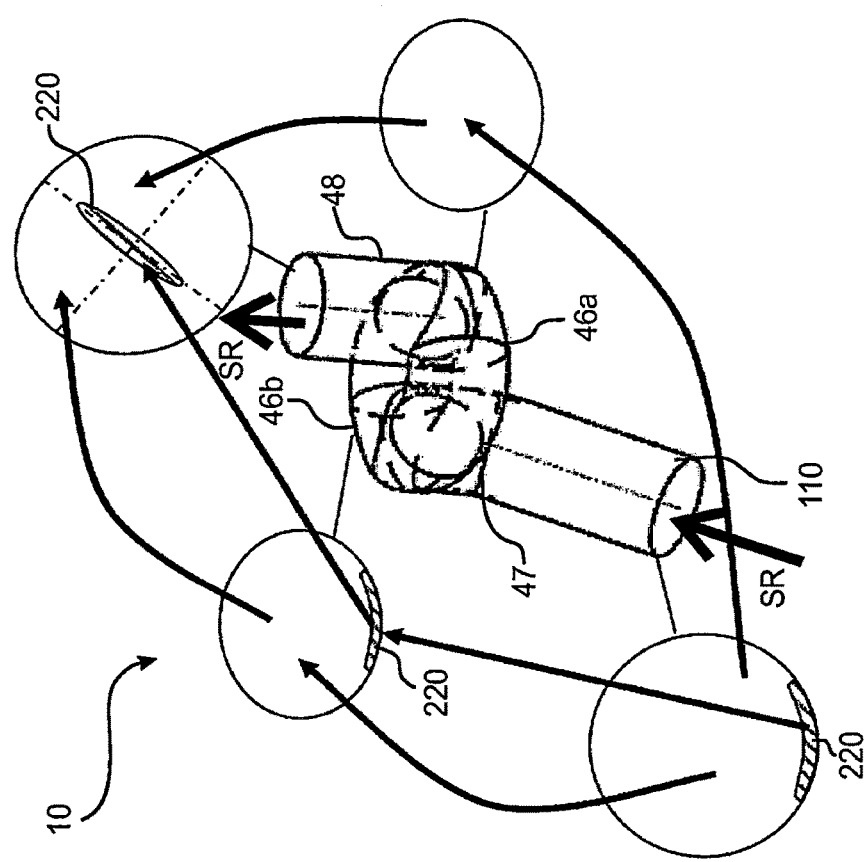

In FIG. 7 schematically a solution is shown which comprises the curved separation channels 46a and 46b. These separation channels are here configured mainly with the same length and mainly with the same curves. The separation channels 46a and 46b of the separation section 46 configure with this embodiment mainly a form of a torus. Simultaneously, it can be recognized that between the flow direction SR in front of the division section 47 and after the combination section 48 a sharp angle is adjusted. Schematically, here the distribution or the rearrangement of the old molten material 220 can be recognized with the corresponding arrows. The FIG. 8 shows the combination of an overturning device 10 in a star-like layout like it was already described according to FIG. 7.

Figure 9:
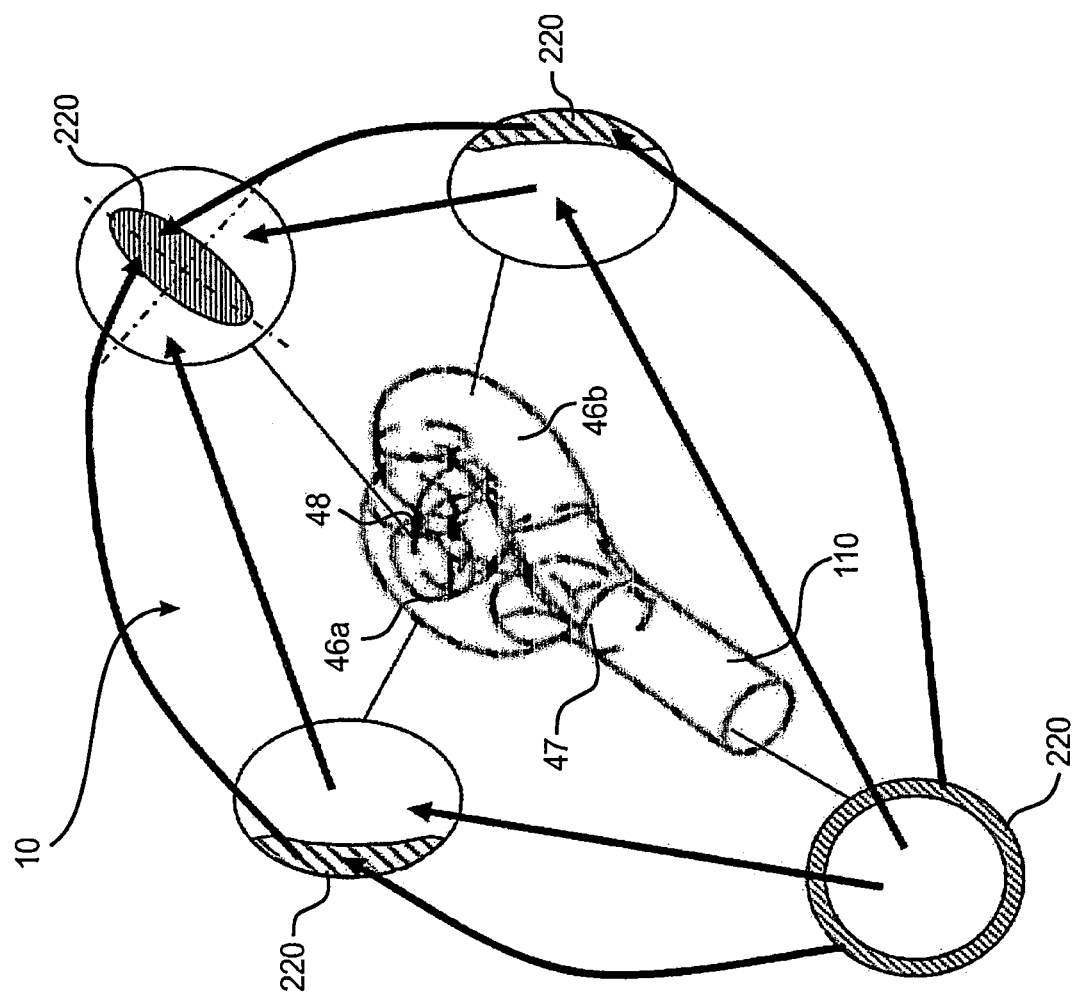

In FIG. 9 a further solution of an overturning device 10 according to the invention is shown. Here, mainly a layout in form of a heart and combination of the single separation channels 46a and 46b occurs. Like it can be recognized, a rearrangement of the flow direction SR of the molten material between the separation section 47 and the combination section 48 of approximately 90° occurs. This leads to the compact construction such that by the mainly completely deflection of the molten material 200 the combination section 48 can be arranged between the separation channels 46a and 46b.

FIGS. 10 and 11 show a solution with which the single separation channels 46a and 46b are spirally interwoven with one another, wherein here four separation channels 46a and 46b are provided. This leads to a corresponding combination which likewise provides the old molten material 220 from the edge in the centre in the combination section 48.

Figure 12:
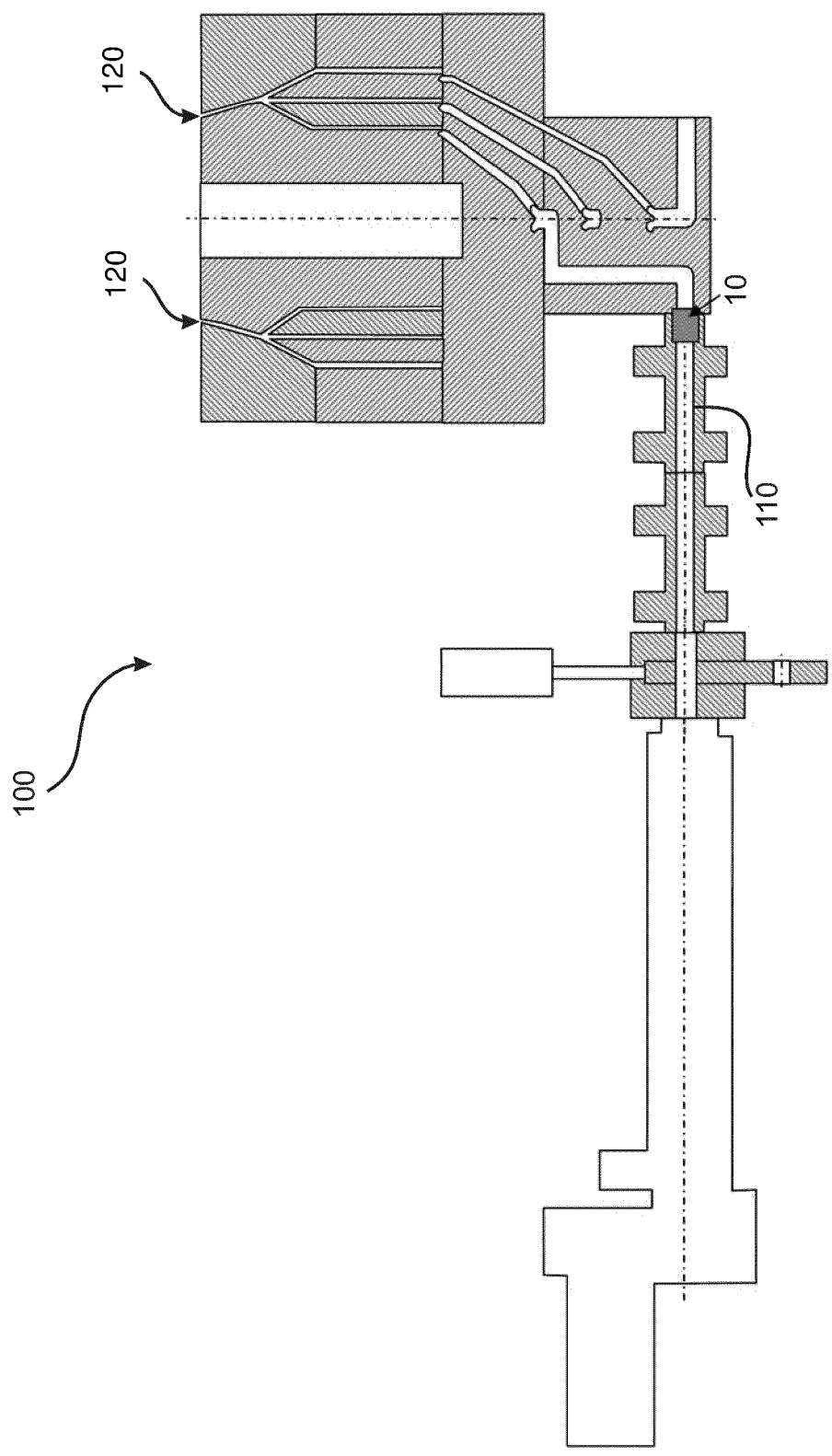

In FIG. 12 it is shown how an overturning device 10 can be assembled in a melt channel 110 in a blow head 100. Thereby, here any of the described embodiments of the overturning devices 10 can be applied. Thereby, the blow head 100 comprises a ring-like blow output 120.

Figure 13:
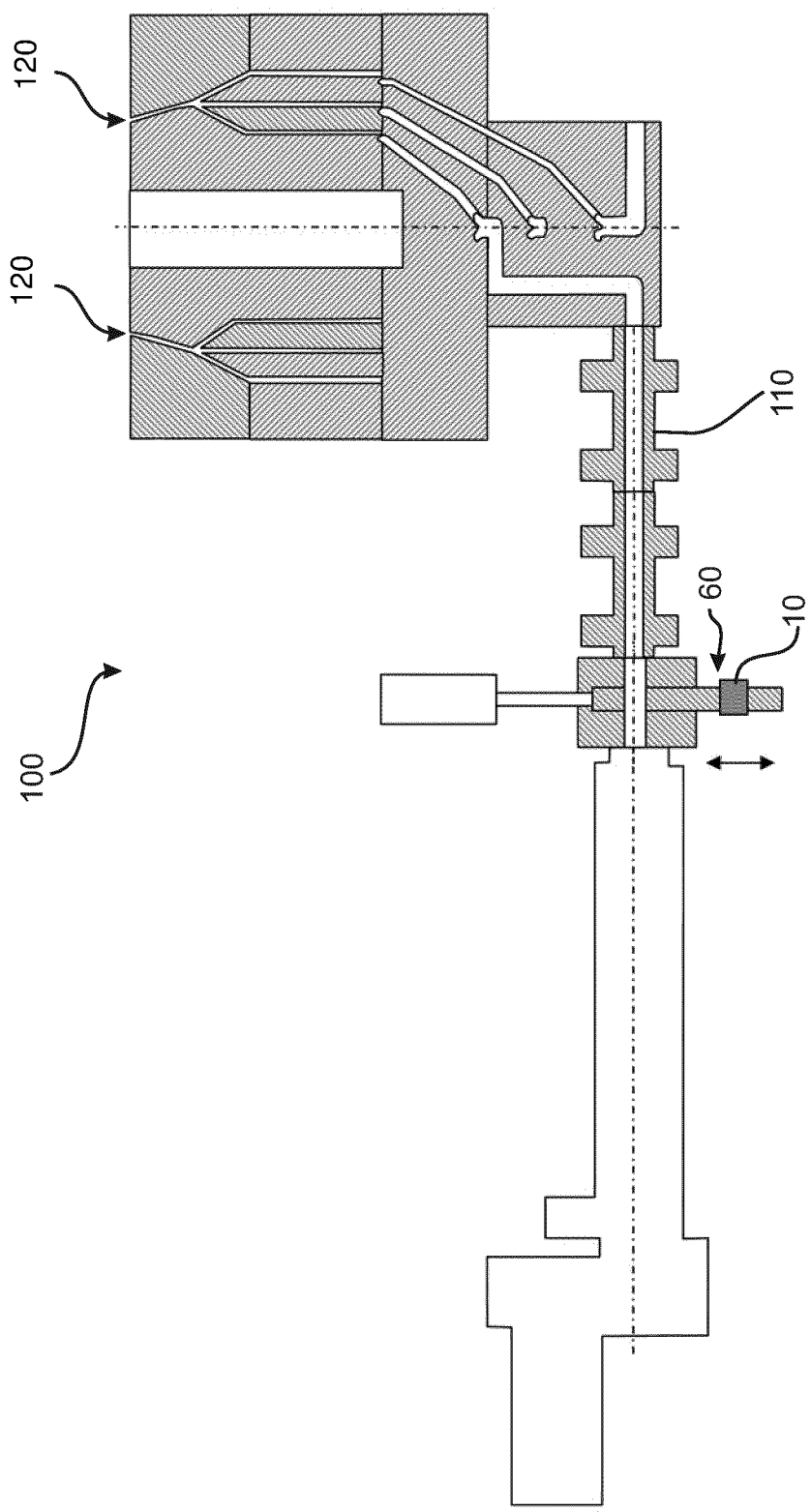

FIG. 13 shows a solution similar to FIG. 12, wherein however here a shifting device 60 is shown for the overturning device 10. According to FIG. 12 the overturning device 10 is in the second position and therewith outside a fluid communicating intervention with the melt channel 110. This is the operation position. For the purge situation the overturning device 10 is inserted into the melt channel 110 via the shifting device 60 and therewith the functionality according to the invention for the reduction of the purge time can be provided.

The previous description of the embodiments describes the present invention only within the scope of examples. Naturally, single features of the embodiments as far as technically meaningful can be freely combined with one another without leaving the scope of the present invention.

REFERENCE SIGNS

10 Overturning device
20 Melt inlet
22 Centre of melt inlet
24 Edge of melt inlet
30 Melt outlet
32 Centre of melt outlet
34 Edge of melt outlet
40 Melt guiding means
46 Separation section
46a First separation channel
46b Second separation channel
47 Division section
47a Separation wall
47b Outer wall
48 Combination section
48b Outer wall
60 Shifting device
70 Free flow area
100 Blow head
110 Melt channel
120 Blow output
200 Molten material
210 New molten material
220 Old molten material
SR Flow direction of the molten material

What is claimed is:

1. An overturning device for overturning a molten material in a melt channel, the overturning device comprising:
   a melt inlet;
   a melt outlet; and
   at least one melt guide, wherein between the melt inlet and the melt outlet the at least one melt guide is assembled for a rearrangement of molten material from a center of the melt inlet to an edge of the melt outlet and for a rearrangement of molten material from an edge of the melt inlet into a center of the melt outlet,
   wherein the at least one melt guide comprises a separation section with a first separation channel and a second separation channel, wherein a division section configured to separate the molten material is located proximal the separation section and a combination section configured to merge the molten material is located distal the separation section, and
   wherein the first separation channel and the second separation channel are each configured in a torus shape.

2. The overturning device according to claim 1, wherein the combination section is configured for a central merging of edge sections of the molten material.

3. The overturning device according to claim 1, wherein the first separation channel and the second separation channel are each configured in form of a curve.

4. The overturning device according to claim 1, wherein the first separation channel and the second separation channel each comprise an equal or mainly equal length.

5. The overturning device according to claim 1, wherein the flow direction of the molten material comprises an acute angle in the combination section with the flow direction of the molten material in the division section.

6. The overturning device according to claim 1, wherein the first separation channel and the second separation channel each comprise a curvature that alters the flow direction of the molten material at least partially in contrast to the flow direction of the molten material in the division section about more than approximately 90°.

7. The overturning device according to claim 1, wherein the first separation channel and the second separation channel are configured to have at least partially a spiral form with one another.

8. The overturning device according to claim 1, wherein a shifting device is provided for a shifting of the overturning device between a first position in which the melt inlet and the melt outlet are in a fluid communicating connection with the melt channel, and a second position in which the melt inlet and the melt outlet are separated from the melt channel.

9. The overturning device according to claim 1, wherein the free flow area of the melt guide corresponds or mainly corresponds with at least a free flow area of the melt inlet or a free flow area of the melt outlet.

10. A blow head for performing a blow film extrusion method comprising:
    a melt channel for conveying molten material to a blow output of the blow head; and
    at least one overturning device for overturning a molten material in a melt channel comprising:
      a melt inlet,
      a melt outlet, and
      at least one melt guide located between the melt inlet and the melt outlet for a rearrangement of molten material from a center of the melt inlet to an edge of the melt outlet and for a rearrangement of molten material from an edge of the melt inlet into a center of the melt outlet is assembled,
    wherein the at least one melt guide comprises a separation section with a first separation channel and a second separation channel, wherein a division section configured to separate the molten material is located proximal the separation section and a combination section configured to merge the molten material is located distal the separation section, and
    wherein the first separation channel and the second separation channel are each configured in a torus shape.

11. The blow head according to claim 10, wherein neighboring separation channels of neighboring overturning devices are newly combined to the melt channels.

12. A method for the performance of a purge process in an extrusion device comprising:
    introducing of a molten material in a melt inlet of an overturning device for overturning a molten material in a melt channel comprising a melt inlet, a melt outlet and at least one melt guide located between the melt inlet for a rearrangement of molten material from a center of the melt inlet to an edge of the melt outlet and for a rearrangement of molten material from an edge of the melt inlet into a center of the melt outlet,
    wherein the at least one melt guide comprises a separation section with a first separation channel and a second separation channel, wherein a division section configured to separate the molten material is located proximal in front of the separation section a division section for separating the molten material to the first separation channel and the second separation channel and a combination section configured to merge the molten material is located distal after the separation section a combination section for merging the molten material from the first separation channel and the second separation channel is arranged, wherein the first separation channel and the second separation channel are each configured in a torus shape, rearranging of the molten material from the center of the melt inlet to the edge of the melt outlet of the overturning device, and rearranging of the molten material from the edge of the melt inlet into the center of the melt outlet.

13. The overturning device according to claim 1, wherein the first separation channel and the second separation channel each comprise a separation wall which is newly emerging by the separation and an outer wall which is taken over from the separation section, wherein the outer walls of each of the first separation channel and the second separation channel are merged in the combination section and the separation walls are merging into the outer wall of the combination section.

14. The blow head according to claim 10, wherein the first separation channel and the second separation channel each comprise a separation wall which is newly emerging by the separation and an outer wall which is taken over from the separation section, wherein the outer walls of each of the first separation channel and the second separation channel are merged in the combination section and the separation walls are merging into the outer wall of the combination section.

15. An overturning device for overturning a molten material in a melt channel, the overturning device comprising:

a melt inlet;

a melt outlet; and at least one melt guide between the melt inlet and the melt outlet, wherein the at least one melt guide is assembled for a rearrangement of molten material from the center of the melt inlet to the edge of the melt outlet and for a rearrangement of molten material from the edge of the melt inlet into the center of the melt outlet, wherein the at least one melt guide comprises a separation section with a first separation channel and a second separation channel, wherein a division section configured to separate the molten material is located proximal the separation section and a combination section configured to merge the molten material is located distal the separation section, and wherein the first separation channel and the second separation channel are spirally interwoven with one another.

* * * * *